United States Patent [19]

Okami et al.

[11] Patent Number: 5,569,684
[45] Date of Patent: Oct. 29, 1996

[54] HEAT CONDUCTIVE SILICONE RUBBER COMPOSITION

[75] Inventors: Takehide Okami; Tokio Sekiya, both of Gunma-ken, Japan

[73] Assignee: Takita Patent & Engineering, Tokyo, Japan

[21] Appl. No.: 398,072

[22] Filed: Mar. 3, 1995

[30] Foreign Application Priority Data

Mar. 3, 1994 [JP] Japan .................................. 6-060105

[51] Int. Cl.⁶ ...................................... C08K 9/00
[52] U.S. Cl. .......................... 523/209; 523/216; 523/326; 524/433; 524/588
[58] Field of Search ................... 523/205, 216, 523/209, 326; 524/433, 588

[56] References Cited

U.S. PATENT DOCUMENTS

| | | | |
|---|---|---|---|
| 4,604,424 | 8/1986 | Cole et al. | 524/433 |
| 4,926,673 | 5/1990 | Laurent et al. | 524/588 |
| 5,021,494 | 6/1991 | Toya | 524/433 |
| 5,039,509 | 8/1991 | Miyata et al. | 423/636 |
| 5,106,608 | 4/1992 | Retschnig et al. | 423/635 |
| 5,204,384 | 4/1993 | Matsushita et al. | 524/588 |
| 5,424,352 | 6/1995 | Watanabe | 524/433 |

FOREIGN PATENT DOCUMENTS 61-085474  5/1986  Japan .

*Primary Examiner*—Mark D. Sweet
*Attorney, Agent, or Firm*—Millen, White, Zelano, & Branigan, P.C.

[57] ABSTRACT

Disclosed is a heat conductive silicone rubber composition comprising a cross-linkable organopolysiloxane composition and a filler, with the filler being magnesium oxide treated so as to have a hydrophobic surface and having a content of from 30 to 70% by volume in the composition.

17 Claims, No Drawings

HEAT CONDUCTIVE SILICONE RUBBER COMPOSITION

FIELD OF THE INVENTION

The present invention relates to a silicone rubber composition and, more particularly, to a silicone rubber composition having high heat conductivity and excellent electrical insulating properties which is suitably used as a heat-reducing and electrical insulating material in holding and fixing heat generating elements in a wide variety of electronic and electric equipment.

BACKGROUND OF THE INVENTION

As electric and electronic equipment has been miniaturized and integrated at a higher level, intense interest has recently been shown towards the problem of reducing the heat generated by various devices, e.g., power transistors, thyristors, rectifiers, transformers, etc., set in such equipment.

In using various heat-generating devices as cited above, heat reduction has so far been carried out by attaching a heat sink thereto or mounting them on a metallic chassis. In addition, the devices as described above have been mounted on a heat sink or chassis via an electrical insulating material, because it is generally undesirable to bring a heat reducing material into direct contact with electronic or electric devices from the standpoint of designing various types of equipment and in view of safety.

As for the electrical insulating material described above, there have so far been known organic rubbers, plastics and the like as organic types, or porcelain, glass fibers, mica and the like as inorganic types.

However, the organic insulating materials as cited above are poor in heat conductivity although they have satisfactory electrical insulating properties. The inorganic insulating materials, on the other hand, are satisfactory with respect to the heat conductivity, but not only are they poor in workability, because of their hardness and brittleness, but also it is difficult for them to come into close contact with the surface of a heat-generating material as well as the surface of a heat-reducing material since their surfaces are not of the proper condition. All of those materials, therefore, are not suitable for an electrical insulating material for which both high heat conductivity and excellent electrical insulating properties are required.

In recent years, metal oxides such as aluminum oxide and metal nitrides such as boron nitride and aluminum nitride have been used as inorganic fillers, resulting in an improvement in heat conductivity.

However, some extent of heat conductivity can be brought about by aluminum oxide, but it is still insufficient; while boron nitride and aluminum nitride have a drawback of high price, they do have good performance.

In addition, the heat conductive silicone composition containing the magnesium oxide obtained by burning a specified magnesium hydroxide at a temperature of 1,100°–1,600° C. is disclosed in Japanese Tokkai Hei 5-239358 (the term "Tokkai" as used herein means an "unexamined published patent application"). When the magnesium oxide is used as the filler for imparting heat conductivity to a silicone rubber, however, there occurs a phenomenon in that the silicone rubber molding crumbles into decay through the cracking of the silicone rubber under a high temperature-high humidity condition. One main reason for this is that the magnesium oxide has hygroscopicity and it gives strong alkalinity as a result of moisture absorption.

Such being the case, we have made intensive studies for obviating the above-described defect of the magnesium oxide. Thus, it has been found that a satisfactory result can be obtained by rendering the surface of magnesium oxide hydrophobic, thereby achieving the present invention.

SUMMARY OF THE INVENTION

Therefore, a first object of the present invention is to provide a silicone rubber composition having both high heat conductivity and excellent electrical insulating properties.

A second object of the present invention is to provide a silicone rubber composition which can be prepared at a low price and well-suited for an electrical insulating material having a good surface condition and excellent heat-reducing properties.

The above-described objects are attained with a heat conductive silicone rubber composition comprising a cross-linkable organopolysiloxane composition and a filler, with the filler being magnesium oxide treated so as to have a hydrophobic surface and having a content of from 30 to 70% by volume in the composition.

In accordance with embodiments of the present invention, the heat conductive silicone rubber compositions obtained can serve as a cheap, highly heat conductive, electrical insulating material, because they contain magnesium oxide which is available at a low price and has high heat conductivity. Moreover, they have excellent storage stability under a high temperature-high humidity condition because the magnesium oxide used therein has a surface treated so as to have hydrophobic properties.

DETAILED DESCRIPTION OF THE INVENTION

As for the cross-linkable organopolysiloxane composition, organopolysiloxane compositions of radical-curable type, those of addition-curable type and those of condensation-curable type are examples thereof.

The organopolysiloxane compositions of radical-curable type are preferably silicone compositions containing (A) 100 parts by weight of organopolysiloxanes represented by the following average compositional formula (I) and (B) a catalytic amount of organic peroxide:

$$R^1_a SiO_{4-a/2} \qquad (I)$$ 

wherein $R^1$ represents a substituted or unsubstituted monovalent hydrocarbon group or a hydroxyl group, and a is a number of from 1.85 to 2.10.

The organopolysiloxanes represented by formula (I) are well-known as the main component of silicone rubbers, and have a linear structure in a substantial sense. However, they may have any other structures, provided that a is within the range of 1.85 to 2.10. For instance, trifunctional siloxane units may be introduced thereinto, or the end groups of their molecular chains may be a vinyldiorganosilyl group (e.g., dimethylvinylsilyl, etc.), a triorganosilyl group (e.g., trimethylsilyl, trivinylsilyl, etc.), a hydroxydiorganosilyl group (e.g., dimethylhydroxysilyl, etc.) or the like. Further, it is desirable that the organopolysiloxanes used herein have such a polymerization degree as to provide a viscosity of at least 1,000 cSt, preferably 5,000 cSt, and more preferably from 100,000 to 10,000,000 cSt, at 25° C., and thereby they can be made elastic rubbers having comparatively high mechanical strength.

Specific examples of a monovalent hydrocarbon group represented by $R^1$ include alkyl groups such as methyl, ethyl, isopropyl, butyl, 2-ethylbutyl, octyl, etc., alkenyl groups such as vinyl, allyl, hexenyl, etc., cycloalkyl groups such as cyclohexyl, cyclopentyl, etc., aryl groups such as phenyl, tolyl, xylyl, etc., aralkyl groups such as benzyl, phenylethyl, etc., and the hydrocarbon groups as cited above whose hydrogen atoms are partly substituted with halogen atom(s), cyano group(s) or so on, such as 3,3,3-trifluoropropyl, 2-cyanoethyl, etc.

For the organopolysiloxanes used in the present invention, it is desirable that at least 50 mole % of the total hydrocarbon groups represented by $R^1$ be methyl groups and 0–10 mole %, preferably 0.001–0.5 mole %, of the total hydrocarbon groups represented by $R^1$ be vinyl groups.

The organic peroxide [Component (B)] used together with the foregoing Component (A) can be properly chosen from known organic peroxides which are generally used for silicone rubbers.

Specific examples of such organic peroxides include benzoyl peroxide, 2,4-dichlorobenzoyl peroxide, 2,4-dicumyl peroxide, 2,5-dimethylbis(2,5-tert-butyl-peroxy-)hexane, di-tert-butyl peroxide, tert-butylperbenzoate, and so on. Such an organic peroxide as cited above is preferably added in an amount of 0.1 to 5 parts by weight per 100 parts by weight of the organopolysiloxanes as Component (A).

The cross-linkable organopolysiloxane compositions of addition-curable type are preferably silicone compositions containing (C) 100 parts by weight of an organopolysiloxane having at least two alkenyl groups attached to silicon atoms, (D) an organohydrogenpolysiloxane having at least two hydrogen atoms attached to silicon atoms (SiH groups) in an amount such that 0.6–10 SiH groups may be supplied per one alkenyl group in Component (C), and (E) a catalytic amount of platinum or platinum compound.

As for the organopolysiloxane as Component (C), it is desirable that the viscosity thereof be within the range of 500 to 200,000 cSt, particularly 1,000 to 100,000 cSt, at 25° C.

Specific examples of alkenyl groups contained in the organopolysiloxane as Component (C) include alkenyl groups containing 2 to 8 carbon atoms such as vinyl, allyl, 1-methyl-2-propenyl, hexenyl, γ-(meth)acryloxypropyl, etc. Of these alkenyl groups, vinyl groups are particularly preferable in the present invention.

The foregoing organopolysiloxane as Component (C) may contain, as organic groups other than alkenyl groups, substituted or unsubstituted monovalent hydrocarbon groups containing 1 to 10, preferably 1 to 8, carbon atoms, such as alkyl groups (e.g., methyl, ethyl, propyl, butyl, etc.), aryl groups (e.g., phenyl, tolyl, etc.), aralkyl groups (e.g., benzyl, β-phenylethyl, etc.) and the groups as cited above whose hydrogen atoms are in part or all substituted with halogen atoms or so on (e.g., chloromethyl, 3,3,3-trifluoropropyl, etc.).

Specific examples of an organopolysiloxane as described above include the compounds illustrated below:

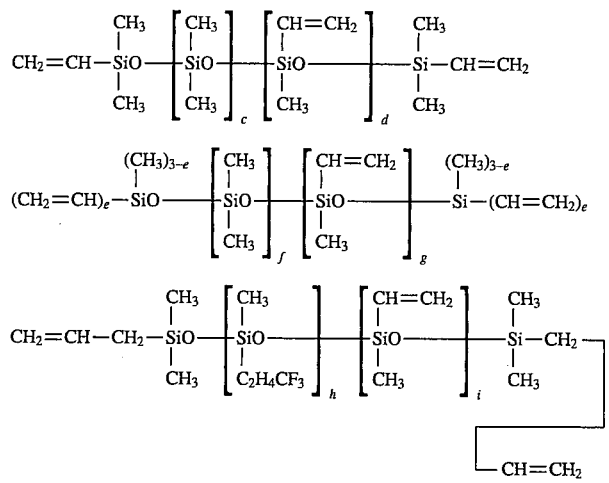

In the above formulae, e is 2 or 3; c, f and h are each a positive integer; d, g and i are each 0 or a positive integer; and c+d, f+g and h+i are each a positive integer of at most 2,000.

The organopolysiloxane as Component (C) may have a straight-chain structure or a partly branched structure. The compounds specified above as the organopolysiloxane may be used alone or as a mixture of two or more thereof.

The organohydrogenpolysiloxane used in the present invention [Component (D)] functions as an agent for cross-linking the foregoing organopolysiloxane [Component (C)].

The organohydrogenpolysiloxane may have any of the structures, a straight chain, a branched chain or a ring. The Component (D) may be a mixture of organohydrogensiloxanes having different structures as cited above. Specific examples of an organohydrogenpolysiloxane used as Component (D) include the compounds illustrated below:

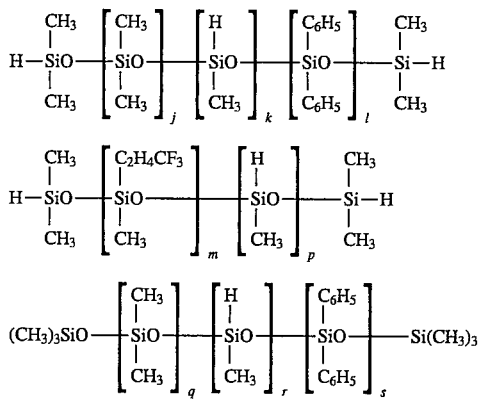

In the above formulae, j, k, l, m, p, q and s are each 0 or a positive integer, r is an integer of no less than 2, and the number of silicon atoms in each molecule is generally not greater than 400.

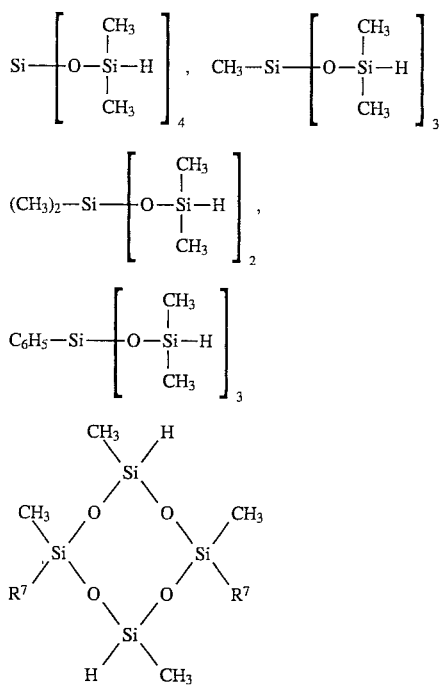

In the above formula, $R^7$ represents a hydrogen atom, a methyl group, a propyl group or a trimethylsiloxy group.

It is desirable that the organohydrogenpolysiloxane be used in an amount such that the hydrogen atoms bonded to silicon atoms may be present in the quantity corresponding to 1.0–20 times by mole, particularly 1.2–10 times by mole, as much as the total quantity of the alkenyl groups contained in the organopolysiloxane used as Component (C).

The platinum or platinum compound used as Component (E) is a catalyst for the addition reaction, and functions as a curing accelerator.

Specific examples thereof include platinum black, solid platinum held by a support such as alumina, silica or the like, chloroplatinic acid, alcohol-modified chloroplatinic acids, chloroplatinic acid-olefin complexes, platinum-vinylsiloxane complexes, and so on.

When the catalyst chosen is in a solid state, it is desirable to finely grind the solid catalyst or to use as the support a substance having a small grain size and a great specific surface area for the purpose of ensuring satisfactory dispersibility thereto. As for the chloroplatinic acid and the chloroplatinic acid-olefin complexes, on the other hand, it is desirable that they be used in the form of a solution dissolved in an alcohol, a ketone, an ether or a hydrocarbon solvent.

These catalysts are used in an amount enough to attain the intended curing speed, or the so-called catalytic amount. However, it is desirable to use them in their individual proportions described below from the economical point of view or from the standpoint of providing a cured material of good qualities.

Specifically, it is desirable that the catalysts compatible with the siloxane components, such as alcohol-modified or siloxane-modified chloroplatinic acids, be used in a proportion of from 0.1 to 100 ppm, based on platinum, to the total amount of the foregoing Component (C) and Component (D), while it is desirable to use the solid catalysts such as platinum black in a proportion of from 20 to 500 ppm, based on platinum, to the total amount of the foregoing component (C) and component (D).

The cross-linkable organopolysiloxane compositions of condensation-curable type are preferably compositions containing (F) 100 parts by weight of diorganopolysiloxanes represented by the following general formula (II), wherein both ends of the molecular chain are blocked with hydroxyl groups, and (G) 0.5–30 parts by weight of a silane or siloxane which contains at least three silicon-bonded hydrolyzable groups:

wherein $R^2$ and $R^3$ are the same or different, unsubstituted or substituted, monovalent hydrocarbon groups, and n is an integer of no less than 10.

The foregoing diorganopolysiloxanes as Component (F) can be properly chosen from the hydroxyl-terminal diorganopolysiloxanes which are known as a raw material of silicone rubbers.

Specific examples of $R^2$ and $R^3$ include alkyl groups such as methyl, ethyl, propyl, butyl, etc., alkenyl groups such as vinyl, allyl, etc., aryl groups such as phenyl, etc., cycloalkyl groups such as cyclohexyl, etc., and the hydrocarbon groups as cited above whose hydrogen atoms are in part or all substituted with halogen atom(s), cyano group(s) or so on, such as 3,3,3-trifluoropropyl, 2-cyanoethyl, etc. Preferably, $R^2$ and $R^3$ are methyl groups.

It is preferable for the Component (F) to have a viscosity ranging from 100 to 1,000,000 cSt, particularly from 3,000 to 50,000 cSt. When the viscosity of the Component (F) is lower than 100 cSt, the resulting composition cannot provide an elastic cured material having excellent mechanical strength; while when it is higher than 1,000,000 cSt the viscosity of the resulting composition is too high to ensure desirable workability in practical use.

Additionally, the structures of the diorganopolysiloxanes as Component (F) are linear in a substantial sense, but siloxane moieties having a three-dimensional structure may be introduced therein so far as their introduction rate is low.

The silane or siloxane used [as Component (G)] in the present invention functions so as to react with the diorganopolysiloxanes as Component (F) at ordinary temperature to cure them, or as a curing agent, and is an organosilane represented by the following general formula (III) or partly hydrolyzed products thereof:

wherein $R^8$ represents a substituted or unsubstituted monovalent hydrocarbon group similar to the foregoing $R^2$ and $R^3$, X represents a hydrolyzable group chosen from among an acyloxy group, an alkoxy group, a ketoxime group, an alkenyloxy group, an amino group, an aminoxy group, an amido group and the like, and t is 3 or 4.

Specific examples of a silane or siloxane as Component (G) include the compounds illustrated below:

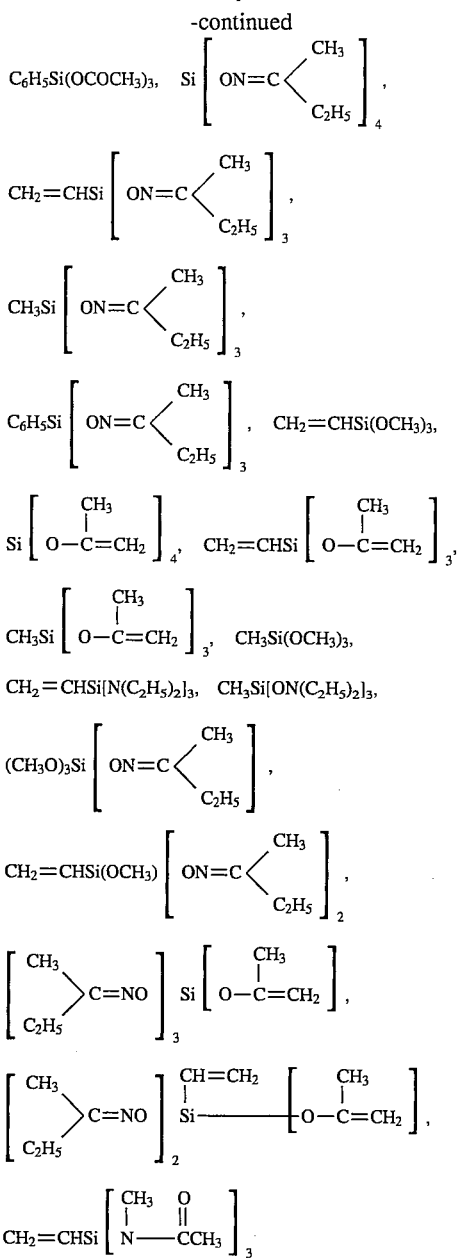

These compounds can be used alone or as a mixture of two or more thereof.

It is desirable that the Component (G) be added in the proportion of from 0.5 to 30 parts by weight, particularly from 2 to 15 parts by weight, to 100 parts by weight of the foregoing Component (F). When the proportion of the Component (G) is less than 0.5 part by weight, the composition cannot be cured to a sufficient extent through the cross-linking reaction in the presence of moisture; while the cured composition becomes too hard when the proportion of the Component (G) is increased beyond 30 parts by weight.

In addition, a catalyst which can promote the reaction between the Component (F) and the Component (G) may be used, if needed.

Specific examples of such a catalyst include metal salts of organic carboxylic acids, such as lead 2-ethyloctoate, dibutyltin diacetate, dibutyltin dilaurate, butyltin tri-2-ethylhexoate, iron 2-ethylhexoate, cobalt 2-ethylhexoate, manganese 2-ethylhexoate, zinc 2-ethylhexoate, stannous caplylate, stannic naphthenate, stannic oleate, stannic butyrate, titanium naphthenate, zinc naphthenate, cobalt naphthenate, zinc stearate, etc.; organotitanic acid esters, such as tetrabutyl titanate, tetra-2-ethylhexyl titanate, triethanolamine titanate, tetra(isopropenyloxy) titanate, etc.; organotitanium compounds, such as organosiloxytitanium, β-carbonyltitanium, etc.; alkoxyaluminum compounds; aminoalkyl-substituted alkoxysilanes, such as 3-aminopropyltriethoxysilane, N-(trimethoxysilylpropyl)ethylenediamine, etc.; amine compounds and the salts thereof, such as hexylamine, dodecylamine phosphate, etc.; quaternary ammonium salts, such as benzyltriethylammonium acetate, etc.; alkali metal salts of lower fatty acids, such as potassium acetate, sodium acetate, lithium oxalate, etc.; dialkylhydroxylamines, such as dimethylhydroxylamine, diethylhydroxylamine, etc.; and guanidine compounds such as tetramethylguanidylpropyltrimethoxysilane, etc.

To the cross-linkable organopolysiloxane compositions described above, including the organopolysiloxane compositions of radical-curable, addition-curable and condensation-curable types, there can further be added, if desired, reinforcing fillers represented by fumed silica, wet silica and treated silica, non-reinforcing fillers represented by calcium carbonate, heavy silica and quartz powder (wherein these fillers may be treated with a silane, an organic acid or so on), pigments of various kinds, heat-resisting additives represented by iron oxides and cerium oxides, adhesion aids of various kinds, an agent for providing flame-retarding properties and/or so on, so far as they have no adverse influences on characteristics of the present thermal conductive silicone rubber composition.

The magnesium oxide in the present silicone rubber composition, which is a filler for giving thereto the heat conductivity as its functional characteristic, is described below in detail.

It is required of the magnesium oxide used in the present invention to have a hydrophobic surface. In a treatment for giving hydrophobicity to the magnesium oxide surface, silanes, siloxanes or silazanes can be used. In the case of coating the magnesium oxide surface with high-molecular siloxane resins, however, there is the possibility of lowering the heat conductivity. In general, therefore, it is preferable that a treatment with silanes or low-molecular siloxanes as the partly hydrolyzed products thereof (especially those having a polymerization degree of 8 or less) be given to magnesium oxide.

As for the silanes used in the aforesaid treatment, silanes represented by the following general formula (IV) are suitable examples thereof:

$$R^4{}_b Si(OR^5)_{4-b} \tag{IV}$$

wherein $R^4$ represents a saturated or unsaturated, unsubstituted or substituted monovalent hydrocarbon group; $R^5$ represents a methyl group or an ethyl group; and b is 0 or 1.

Specific examples of a silane or low-molecular siloxane which can be used in the treatment for giving hydrophobicity to the magnesium oxide surface are illustrated below:

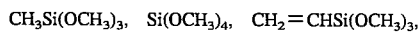

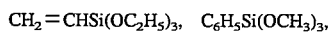

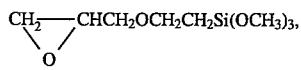

-continued $$CH_2=C(CH_3)-C(=O)-O(CH_2)_3Si(OCH_3)_3,$$

$$CH_2=C(CH_3)-C(=O)-O(CH_2)_3Si(OC_2H_5)_3,$$

$$CH_2=CHC(=O)O(CH_2)_3Si(OCH_3)_3,$$

$$CH_2=CHC(=O)O(CH_2)_3Si(OC_2H_5)_3,$$

In addition, there can be used silazanes represented by the following general formula (V):

$$[R^6{}_3Si]_2NH \quad (V)$$

wherein $R^6$ represents a methyl group, an ethyl group or a phenyl group.

Specific examples of such silazanes are illustrated below::

$$[(CH_3)_3Si]_2NH, \quad [(CH_3)(C_6H_5)_2Si]_2NH,$$

$$[(CH_3)_2(CH_2=CH)Si]_2NH,$$

$$(CH_3)_3SiN(H)-Si(CH_3)_2-N(H)Si(CH_3)_3,$$

$$(CH_3)_2(CH_2=CH)SiN(H)-Si(CH_3)_2-N(H)Si(CH=CH_2)(CH_3)_2$$

The treatment with silanes, siloxanes or silazanes as cited above can be performed in a conventional process. From the workability point of view, it is preferable for the treatment to be carried out in a vapor phase, namely in a dry process, or in a solvent such as toluene, xylene, hexane or the like, namely in a wet process.

For the purpose of carrying forward the surface treatment for giving hydrophobicity with more certainty, it is desirable to insert a step of making water molecules adsorb onto the magnesium oxide powder, that is, a step of making the powder itself absorb moisture.

The filling rate of the hydrophobicity-given magnesium oxide is preferably in the range of 30 to 70% by volume, and particularly preferably in the range of 40 to 60% by volume. When the proportion of the magnesium oxide having a hydrophobic surface is increased beyond 70% of the whole volume of the heat conductive silicone rubber composition, the resulting composition becomes poor in workability and comes to have a dry and crumbling touch; while when the proportion is decreased below 30% by volume the resulting composition cannot have satisfactory heat conductivity.

The present heat conductive silicone rubber composition can be obtained by homogeneously mixing the above-described cross-linkable organopolysiloxane composition with a prescribed amount of the magnesium oxide having a hydrophobic surface by means of a mixer generally used for kneading silicone rubbers, such as a roll mill, a kneader or a Bunbury's mixer, or a Shinagawa's planetary mixer or a butterfly mixer in the case of further admixing with liquid additives.

In molding the present composition thus prepared, a press molding method, an extrusion molding method, a calender molding method or a cast molding method can be adopted to mold the composition into a desired shape, or the composition can be applied to a support such as a glass cloth or so on and then cured using a method suitable to the type of cross-linking reaction to take place therein.

Now, the present invention will be illustrated in more detail by reference to the following examples, but it should be understood that these examples are not be construed as limiting the scope of the invention in any way. Additionally, the term "parts" used for expressing the amounts of ingredients added are by weight.

The heat resistance and the heat conductivity set forth in each example are measured as follow:

(1) Measurement of Heat Resistance;

After a sheet to be examined is held between a power transistor (Model 2SD217 TO-3) and a heat sink (Model YWA-L120), and a current of 30 A is passed therethrough while a voltage of 10 V is applied thereto. Under this condition, the heat resistance of the sheet is measured.

(2) Measurement of Heat Conductivity;

The heat conductivity is determined in accordance with ASTM-F433, and the measurement thereof is made with an apparatus, DYNATECH (trade name, product of Shinku Riko).

Moreover, the surface of magnesium oxide is rendered hydrophobic using the methods as described in the following Reference Examples 1 to 3.

REFERENCE EXAMPLE 1

In a 3-liter separable flask was placed 500 g of magnesium oxide having an average grain size of 1 μm (Pyrokisma 5301, trade name, products of Kyowa Chemical Industry Co., Ltd.), and therethrough was passed steam with stirring to obtain 520 g of moisture-absorbed magnesium oxide. Then, the separable flask was heated up to 130° C., and 175 g of hexamethyldisilazane was dripped onto the inner wall surface of the flask. The resulting mixture underwent the reaction for 30 minutes under reflux, thereby obtaining 570 g of the magnesium oxide having a hydrophobic surface.

By the fact that the thus treated magnesium oxide came up to the water surface when it was put in water, it was confirmed that the magnesium oxide obtained had a hydrophobic surface.

REFERENCE EXAMPLE 2

In a 3-liter separable flask was placed 500 g of the same magnesium oxide as used in Reference Example 1, and therethrough was passed steam with stirring to obtain 518 g of moisture-absorbed magnesium oxide. Then, the separable flask was heated up to 130° C., and 50 g of vinyltrimethoxysilane was dripped onto the inner wall surface of the flask. The resulting mixture underwent the reaction for 1 hour under reflux, thereby obtaining 520 g of the magnesium oxide having a hydrophobic surface.

By the fact that the thus treated magnesium oxide came up to the water surface when it was put in water, it was confirmed that the magnesium oxide obtained had a hydrophobic surface.

REFERENCE EXAMPLE 3

In a 2-liter separable flask, 500 g of the same magnesium oxide as used in Reference Example 1 and 1,000 g of toluene were placed, and made into slurry. Thereinto, 80 g of vinyltrimethoxysilane was dripped, and heated at 85° C. for 1 hour with stirring. Then, the toluene was distilled away therefrom to yield 530 g of the magnesium oxide having a hydrophobic surface.

By the fact that the thus treated magnesium oxide came up to the water surface when it was put in water, it was confirmed that the magnesium oxide obtained had a hydrophobic surface.

EXAMPLE 1

A composition constituted of 100 parts of a diorganopolysiloxane raw rubber containing methyl groups and vinyl groups as the organic groups attached to silicon atoms, the proportion of the vinyl groups being 0.2 mole % to the whole organic groups, and dimethylvinylsilyl groups as the both terminal groups (viscosity: about 1,500,000 cSt), 200 parts of the magnesium oxide having a hydrophobic surface, which was obtained in Reference Example 1, and 2 parts of a silicone oil paste containing 2,4-dichlorobenzoyl peroxide (in a proportion of 50% by weight) was homogeneously kneaded with a two-rod roll. Then, the kneaded composition was heated and pressed for 10 minutes with a given metallic die under the condition of 150° C.-50 kg/cm$^2$.

Further, it was post-cured for 1 hour at 200° C. to be made into a sheet having a thickness of 0.5 mm.

For the heat conductivity measurement according to ASTM-F433, on the other hand, a disc having a diameter of 50 mm and a thickness of 9 mm was prepared under the same conditions as described above. The magnesium oxide content in each of the thus prepared sheet and disc (which are called moldings hereinafter) was 35% by volume.

Then, the heat resistance and the heat conductivity of these moldings were measured using the methods described above. The results obtained are shown in Table 1.

EXAMPLE 2

A sheet having a thickness of 0.5 mm and a disc having a diameter of 50 mm and a thickness of 9 mm were prepared in the same manner as in Example 1, except that the amount of the magnesium oxide having the hydrophobic surface was increased to 400 parts. The magnesium oxide content in each of the moldings obtained was 52% by volume.

Then, the heat resistance and the heat conductivity of each of these moldings were measured in the same manner as in Example 1, and the results obtained are also shown in Table 1.

Further, the initial characteristics of the 2 mm-thick sheet and the characteristics of this sheet after 14 days' storage under the high temperature-humidity condition of 80° C.-95% RH were examined in accordance with JIS-C-2123. As a result, significant changes in the characteristics were not observed, as shown in Table 2.

TABLE 2

|  | Example 2 | Comparative Example 3 |
|---|---|---|
| Species of Filler | Magnesium Oxide having Hydrophobic Surface | untreated Magnesium Oxide |
| Type of Curing | Radical Curing | Radical Curing |
| Initial Stage |  |  |
| Hardness [JISA] | 68 | 70 |
| Elongation (%) | 100 | 90 |
| Tensile Strength (kgf/cm$^2$) | 17 | 19 |
| After 14 Days' Storage under 80° C. - 95% RH |  |  |
| Hardness [JISA] | 67 | Measurements were impracticable because the sheet crumbled into decay |
| Elongation (%) | 80 |  |
| Tensile Strength (Kgf/cm$^2$) | 15 |  |

COMPARATIVE EXAMPLE 1

A sheet having a thickness of 0.5 mm and a disc having a diameter of 50 mm and a thickness of 9 mm were prepared in the same manner as in Example 1, except that burned alumina (A-15, trade name, products of Tatsumori Co., Ltd.) was used in place of the magnesium oxide in the same amount. The burned alumina content in each of the moldings obtained was 34% by volume.

TABLE 1

|  | Example 1 | Example 2 | Comparative Example 1 | Comparative Example 2 | Example 3 | Comparative Example 4 |
|---|---|---|---|---|---|---|
| Species of Filler (Content of Filler) | Magnesium Oxide having Hydrophobic Surface (35 vol %) | Magnesium Oxide having Hydrophobic Surface (52 vol %) | Burned Alumina (34 vol %) | Burned Alumina (51 vol %) | Magnesium Oxide having Hydrophobic Surface (45 vol %) | Aluminum Oxide (43 vol %) |
| Type of Curing | Radical Curing | Radical Curing | Radical Curing | Radical Curing | Addition Curing | Addition Curing |
| Thickness of Sheet (mm) | 0.5 | 0.5 | 0.5 | 0.5 | 0.5 | 0.5 |
| Heat Resistance (°C./w) | 0.7 | 0.4 | 1.4 | 0.9 | 0.5 | 1.1 |
| Heat Conductivity (cal/sec · °C. · cm) | $2.4 \times 10^{-3}$ | $9.8 \times 10^{-3}$ | $1.8 \times 10^{-3}$ | $3.1 \times 10^{-3}$ | $5.0 \times 10^{-3}$ | $2.6 \times 10^{-3}$ |

COMPARATIVE EXAMPLE 2

A sheet having a thickness of 0.5 mm and a disc having a diameter of 50 mm and a thickness of 9 mm were prepared in the same manner as in Example 2, except that burned alumina (A-15, trade name, products of Tatsumori Co., Ltd.) was used in place of the magnesium oxide in the same amount. The burned alumina content in each of the moldings obtained was 51% by volume.

Then, the heat resistance and the heat conductivity of each of these moldings were measured in the same manner as in Example 1, and the results obtained are also shown in Table 1.

COMPARATIVE EXAMPLE 3

A sheet having a thickness of 0.5 mm and a disc having a diameter of 50 mm and a thickness of 9 mm were prepared in the same manner as in Example 2, except that untreated magnesium oxide (Pyrokisma 5301, trade name, products of Kyowa Chemical Industry Co., Ltd.) was used in place of the magnesium oxide having the hydrophobic surface in the same amount. The untreated magnesium oxide content in each of the moldings obtained was 52% by volume.

Then, the heat resistance and the heat conductivity of each of these moldings were measured in the same manner as in Example 1, and the results obtained are also shown in Table 1.

Further, the initial characteristics of the 2 mm-thick sheet and the characteristics of this sheet after 14 days' storage under the high temperature-high humidity condition of 80° C.-95% RH were examined in accordance with JIS-C-2123. As shown in Table 2, the rubber sheet after the 14 days' storage crumbled into decay.

EXAMPLE 3

After admixing 100 parts of dimethylsiloxanes blocked with dimethylvinylsilyl groups at the both ends and having a viscosity of 30,000 cSt at 25° C., 300 parts of the magnesium oxide having a hydrophobic surface, which was obtained in Reference Example 2, 0.4 part (2 wt % based on platinum) of a 2-ethylhexyl alcohol solution of chloroplatinic acid and 0.01 part of ethynylhexyl alcohol (a controller), 2.2 parts of hydrogenpolysiloxane (cross-linking agent) having the average compositional formula illustrated below was further added thereto and mixed throughly therewith:

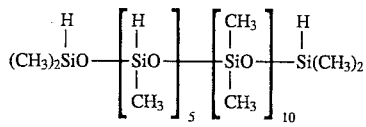

Then, the mixture was homogeneously kneaded with a roll, and the thus kneaded matter was heated and pressed for 10 minutes with a given metallic die under the condition of 150° C.-50 kg/cm². Further, it was post-cured for 1 hour at 200° C. Thus, a sheet having a thickness of 0.5 mm was obtained. For the heat conductivity measurement according to ASTM-F433, on the other hand, a disc having a diameter of 50 mm and a thickness of 9 mm was prepared under the same conditions as described above. The magnesium oxide content in each of the moldings was 45% by volume.

Then, the heat resistance and the heat conductivity of these moldings were measured in the same ways as in Example 1. The results obtained are shown in Table 1.

COMPARATIVE EXAMPLE 4

A sheet having a thickness of 0.5 mm and a disc having a diameter of 50 mm and a thickness of 9 mm were prepared in the same manner as in Example 3, except that untreated aluminum oxide (alumina AL-24, trade name, products of Showa Denko K.K.) was used in place of the magnesium oxide in the same amount. The untreated aluminum oxide content in each of the moldings was 43% by volume.

Then, the heat resistance and the heat conductivity of these moldings were measured in the same ways as in Example 1. The results obtained are shown in Table 1.

EXAMPLE 4

After mixing 100 parts of dimethylpolysiloxane oil blocked with hydroxyl groups at both ends and having a viscosity of 20,000 cSt at 25° C. with 200 parts of the magnesium oxide having undergone the surface treatment in Reference Example 3, 0.5 part of γ-glycidylpropyltri-methoxysilane, 8 parts of vinyltripropenylsilane and 1 part of γ-aminopropyltriethoxysilane as an adhesion aid were further admixed under reduced pressure, thereby obtaining an adhesive composition. This composition was formed into a disc having a diameter of 50 mm and a thickness of 9 mm in accordance with ASTM-F433, and cured over a period of 10 days in the atmosphere of 25° C.-55% RH. At the conclusion of curing, the disc underwent the heat conductivity measurement. The result obtained is shown in Table 3. Additionally, the content of the magnesium oxide in the composition was 33% by volume.

TABLE 3

| | Example 4 | Comparative Example 5 |
| --- | --- | --- |
| Species of Filler | Magnesium Oxide having Hydrophobic Surface | Aluminum Oxide |
| Type of Curing | Condensation Curing | Condensation Curing |
| Heat Conductivity (cal/sec · °C. · cm) | $2.3 \times 10^{-3}$ | $1.8 \times 10^{-3}$ |

COMPARATIVE EXAMPLE 5

A disc having a diameter of 50 mm and a thickness of 9 mm was obtained in the same manner as in Example 4, except that aluminum oxide (Admafine Alumina AO-40R, trade name, products of Admatechs Co., Ltd.) was used in place of the magnesium oxide in the same amount, and then cured under the same condition as in Example 4. At the conclusion of the curing, the heat conductivity of the disc was measured. The result obtained is also shown in Table 3. Additionally, the content of the aluminum oxide in the composition was 33% by volume.

The data set forth in the above tables have proved the validity of the present invention.

What is claimed is:

1. A heat conductive silicone rubber composition comprising a cross-linkable organopolysiloxane composition and a filler having a content of from 30 to 70% by volume in said composition, said filler being magnesium oxide having a hydrophobic surface prepared by first treating magnesium oxide with steam to adsorb water molecules thereon, and then treating the resulting magnesium oxide having adsorbed water molecules with a silane, siloxane or silazane.

2. A heat conductive silicone rubber composition according to claim 1, wherein the cross-linkable organopolysiloxane composition is a radical-curable organopolysiloxane composition which contains 100 parts by weight of organopolysiloxanes represented by the following general formula (I) and a catalytic amount of organic peroxide:

$$R_a^1 SiO_{\frac{4-a}{2}} \quad (I)$$

wherein $R^1$ represents a substituted or unsubstituted monovalent hydrocarbon group or a hydroxyl group, and a is a number of from 1.85 to 2.10.

3. A heat conductive silicone rubber composition according to claim 1, wherein the cross-linkable organopolysiloxane composition is an addition-curable organopolysiloxane composition which contains 100 parts by weight of an organopolysiloxane having at least two alkenyl groups attached to silicon atoms, an organohydrogenpolysiloxane having at least two hydrogen atoms attached to silicon atoms and a catalytic amount of platinum or platinum compound, the organohydrogenpolysiloxane being contained in an amount capable of supplying 0.6–10 SiH groups per one alkenyl group in the organopolysiloxane.

4. A heat conductive silicone rubber composition according to claim 1, wherein the cross-linkable organopolysiloxane composition is a condensation-curable organopolysiloxane composition which contains 100 parts by weight of diorganopolysiloxanes represented by the following formula (II), wherein both ends of the molecular chain are blocked with hydroxyl groups, and 0.5–30 parts by weight of a silane or siloxane containing at least three silicon-bonded hydrolyzable groups:

$$HO - \left[ \begin{array}{c} R^2 \\ | \\ SiO \\ | \\ R^3 \end{array} \right]_n - H \quad (II)$$

wherein $R^2$ and $R^3$ are the same or different, unsubstituted or substituted, monovalent hydrocarbon groups, and n is an integer of no less than 10.

5. A heat conductive silicone rubber composition according to claim 4, wherein the silane or siloxane is an organosilane represented by the following general formula (III) or partly hydrolyzed products thereof:

$$R^8_{4-t} SiX_t \quad (III)$$

wherein $R^8$ represents a substituted or unsubstituted monovalent hydrocarbon group, X represents a hydrolyzable group chosen from among an acyloxy group, an alkoxy group, a ketoxime group, an alkenyloxy group, an amino group, an aminoxy group and an amido group, and t is 3 or 4.

6. A heat conductive silicone rubber composition according to claim 1, wherein the magnesium oxide treated so as to have a hydrophobic surface is magnesium oxide treated with a silane or siloxane represented by the following formula (IV) or partly hydrolyzed products thereof:

$$R^4_b Si(OR^5)_{4-b} \quad (IV)$$

wherein $R^4$ represents a saturated or unsaturated, unsubstituted or substituted monovalent hydrocarbon group; $R^5$ represents a methyl group or an ethyl group; and b is 0 or 1.

7. A heat conductive silicone rubber composition according to claim 1, wherein the filler has a content of from 40 to 60% by volume in the composition.

8. A heat conductive silicone rubber composition according to claim 6, wherein the monovalent hydrocarbon group represented by $R^4$ is an alkyl group, an alkenyl group, an aryl group or a cycloalkyl group, which may be substituted with one or more of a halogen atom or a cyano group.

9. A heat conductive silicone rubber composition according to claim 1, wherein the magnesium oxide treated so as to have a hydrophobic surface is magnesium oxide treated with a silazane represented by the following formula (V):

$$[R^6_3 Si]_2 NH \quad (V)$$

wherein $R^6$ represents a methyl group, an ethyl group or a phenyl group.

10. A heat conductive silicone rubber composition according to claim 2, wherein at least 50 mole % of the whole hydrocarbon groups represented by $R^1$ are methyl groups and 0–10 mole % of the whole hydrocarbon groups represented by $R^1$ are vinyl groups.

11. A heat conductive silicone rubber composition according to claim 2, wherein the organic peroxide is benzoyl peroxide, 2,4-dichlorobenzoyl peroxide, 2,4-dicumyl peroxide, 2,5-dimethylbis(2,5-tert-butyl-peroxy)hexane, di-tert-butyl peroxide or tert-butylperbenzoate.

12. A heat conductive silicone rubber composition according to claim 2, wherein the organic peroxide is contained in an amount of 0.1 to 5 parts by weight per 100 parts by weight of the organopolysiloxanes.

13. A heat conductive silicone rubber composition according to claim 3, wherein the platinum or platinum compound is platinum black, chloroplatinic acid, an alcohol-modified chloroplatinic acid, a chloroplatinic acid-olefin complex or a platinum-vinylsiloxane complex.

14. A heat conductive silicone rubber composition according to claim 3, wherein the platinum or platinum compound is platinum black and the platinum black has a content of from 20 to 500 ppm.

15. A heat conductive silicone rubber composition according to claim 3, wherein the platinum or platinum compound is chloroplatinic acid, an alcohol-modified chloroplatinic acid, a chloroplatinic acid-olefin complex or a platinum-vinylsiloxane complex and the chloroplatinic acid, the alcohol-modified chloroplatinic acid, the chloroplatinic acid-olefin complex or the platinum-vinylsiloxane complex has a content of from 0.1 to 100 ppm on a platinum basis.

16. The composition of claim 1, wherein the magnesium oxide having adsorbed water molecules is treated with a silane or siloxane having a polymerization degree of 8 or less to provide the magnesium oxide having a hydrophobic surface.

17. The composition of claim 1, wherein the magnesium oxide having adsorbed water molecules is treated with a silane or siloxane of the formula (IV):

$$R^4_b Si(OR^5)_{4-b} \quad (IV)$$

wherein $R^4$ is a saturated or unsaturated, unsubstituted or oxy or epoxy substituted monovalent hydrocarbon group, $R^5$ is methyl or ethyl and b is 0 or 1, or with a silazane of the formula (V):

$$(R^6_3 Si)_2 NH \quad (V)$$

wherein $R^6$ is methyl, ethyl, phenyl or vinyl, or with a silazane of one of the following two formulae:

$$(CH_3)_3 SiN - \underset{\underset{H}{|}}{\overset{\overset{CH_3}{|}}{Si}} - NSi(CH_3)_3$$
$$\phantom{(CH_3)_3 SiN -} | \phantom{Si} | \phantom{- NSi(CH_3)_3}$$
$$\phantom{(CH_3)_3 SiN -} H \phantom{Si} CH_3 \phantom{- NSi(CH_3)_3} H$$

-continued
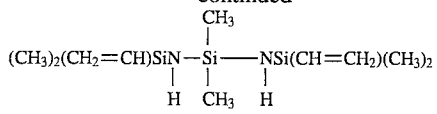
to provide the magnesium oxide having a hydrophobic surface.
* * * * *